Patented Aug. 18, 1942

2,293,038

UNITED STATES PATENT OFFICE 2,293,038

MANUFACTURE OF COATING COMPOSITIONS

Laszlo Auer, Bloomfield, N. J.

No Drawing. Application November 20, 1939, Serial No. 305,409. In Hungary May 19, 1926

18 Claims. (Cl. 106—171)

This invention relates to the manufacture of coating compositions and it comprises varnishes, lacquers and other coating compositions containing modified organic isocolloid materials, such as modified fatty oils, etc., the physical and other properties of which have been modified with the aid of and by means of a minor amount of a polar compound, and particularly nitrocellulose compositions containing such modified organic isocolloids which may advantageously be a modified fatty oil, and it also comprises methods of making such coating compositions wherein the organic isocolloid material, such as a fatty oil, etc., is modified with a minor amount of a polar compound, usually by heating those materials to a suitable temperature sufficient to effect the desired modification thereof, and the modified fatty oil or other organic isocolloid material is dissolved in organic solvent or mixture of such solvents and is sometimes also blended with other varnish and lacquer ingredients as desired to obtain compositions useful as and in coating compositions, such as paints, enamels, varnishes, lacquers and other liquid and plastic compositions, all as more fully hereinafter set forth and as claimed.

In my prior applications which are more fully identified post, I have described processes of modifying the physical and other properties of organic isocolloids, such as fatty oils, resins, etc., with the aid of polar compounds. As stated in my prior applications, the modified organic isocolloid materials obtained from fatty oils, resins, etc., by the processes there described, are useful and advantageous in making varnishes and lacquers and other liquid and plastic compositions.

The present invention, as stated ante, is directed to the manufacture of coating compositions containing such modified organic isocolloid materials, particularly modified fatty oils. And it is a continuation in part of my prior applications; the various organic isocolloids and polar compounds or modifying agents and the several procedures disclosed in such prior applications being useful in the present invention and in the commercial practice thereof.

This application is a continuation in part of my prior application Serial No. 446.174, filed April 21, 1930. That application, in turn, is a continuation in part of my earlier application Serial No. 143,786, filed October 23, 1926, and of the various divisions and continuations of that parent application, particularly the continuation thereof filed April 30, 1929, Serial No. 359,425.

The said parent application and the continuations thereof are as follows:

Ser. No. 143,786, filed Oct. 23, 1926; now Patent 2,189,772
Ser. No. 273,159, filed Apr. 26, 1928; now Patent 1,985,230
Ser. No. 273,160, filed Apr. 26, 1928; now Patent 1,985,231
Ser. No. 359,424, filed Apr. 30, 1929; now Patent 2,007,958
Ser. No. 359,425, filed Apr. 30, 1929; now Patent 2,213,944
Ser. No. 359,426, filed Apr. 30, 1929; now Patent 1,980,366
Ser. No. 359,427, filed Apr. 30, 1929; now Patent 1,957,437
Ser. No. 446,170, filed Apr. 21, 1930; now Patent 2,234,949
Ser. No. 446,171, filed Apr. 21, 1930; now Patent 1,980,367
Ser. No. 446,172, filed Apr. 21, 1930; now Patent 2,213,943
Ser. No. 446,174, filed Apr. 21, 1930; now Patent 2,180,342
Ser. No. 466,587, filed July 8, 1930; now Patent 2,106,708
Ser. No. 188,014, filed Jan. 31, 1938

As disclosed in the above applications, I have found that by modifying organic isocolloids with polar compounds according to the processes described therein, I obtain modified products having altered physical properties, which are useful in various commercial arts and for many industrial purposes; those obtained from fatty oils and resins being generally useful in making varnishes and lacquers.

In the processes described in the said prior applications, the modifying agents are employed in minor amounts by weight on the fatty oil or other organic isocolloid material. The modifying agents are inorganic and organic compounds which are electrolytes or polar compounds capable of influencing the modification of the organic isocolloid substances. With the aid of and by means of such polar compounds, I have modified the viscosity, melting point, solubility and other physical properties of organic isocolloids as described and disclosed in said prior applications.

In those applications many illustrative examples of the practice of my generic invention are disclosed. As stated in my prior applications, such as Ser. Nos. 446,170 and 446,174, illustrative organic isocolloids, or starting materials suitable for modification by my processes, are fatty oils, waxes (animal, vegetable, etc.), natural resins such as rosins, etc., synthetic resins containing natural resins, products containing the acids of fatty oils and resins and their derivatives, such as esters of fatty and resin acids, mineral oils, particularly mineral oils containing naphthenic acids, certain mineral oil products, tar, asphalts, goudrons (petroleum distillation residue), pitch, rubber and rubber-like hydrocarbons, etc.; also chemically pure isocolloids bodies such as styrene, etc. All of the above materials and other like organic isocolloids may be modified with the aid of polar compounds by the various processes disclosed in my prior applications to obtain modified products useful for the purposes stated therein.

In most cases, as shown in those applications, a mixture of the polar compound and the organic isocolloid, such as a fatty oil, is heated to relatively high temperatures, particularly when the polar compound used as the modifying agent is an inorganic salt; temperatures between 250° to 350° C. being sometimes used in such cases.

Such methods are disclosed in my copending application Ser. No. 143,786, mentioned ante as the parent application. In that application, I describe processes for the modification of the physical properties of natural and artificial organic isocolloids, such as fatty oils, resins, etc., with the aid of and by means of "electrolytes" under which term are included organic and inorganic acids, salts of such acids and metallic derivatives of organic compounds (organic metal compounds), separately or mixed. In most of the methods there described, the organic isocolloid (starting material) such as a fatty oil, is heated with a minor amount of the electrolyte or polar compound, at reduced, ordinary or increased pressure; with or without simultaneous or subsequent treatment with sulfur or sulfur compounds such as sulfur chloride, or with gases. Again, the organic isocolloid and the electrolyte may be mixed cold, that is, the modifying agent incorporated at room temperature in the organic isocolloid to be modified. This is advantageous when the modifying agent or polar compound is directly soluble at room temperature in the organic isocolloid being modified thereby. Also the mixing and/or heating may be done in the presence of organic bodies, such as phenols, naphthols, naphthalin, chloroform, acetone, alcohols, formic acid, acetic acid, their homologues and derivatives, etc., which modify certain physical properties, such as adhesion, elasticity, etc. of the products obtained; some of these organic bodies being organic solvents. As stated therein, the mixtures are usually heated to temperatures considerably above room temperature and below the boiling point of the organic isocolloid being so modified. For instance, the electrolyte and the organic isocolloid may be melted together, that is, fused together. Likewise, the specific, illustrative examples given in Ser. No. 143,786 are advantageous for fatty oils, such as linseed oil, rapeseed oil, etc.; even solid oil products, as well as viscous oil products, being obtained as desired. One such example is as follows:

*Example 1.*—To 100 grams of linseed oil are added 5 grams of potassium thiocyanate. The mixture is heated in a vacuum for 2 hours at a temperature between 300° and 350° C. At the end of this time, the vacuum is broken and the modified oil product is poured into molds and allowed to cool.

In the above example, if desired, 5 grams of cobalt linoleate may be added to the oil in addition to the potassium thiocyanate. The cobalt linoleate is drier or siccative as is well known in the varnish industry. It serves to further modify the oil product so obtained.

Also rapeseed oil or other fatty oil may be used in the above example in lieu of linseed oil to obtain other modified fatty oil products.

Likewise, other metal salts may be substituted for the potassium thiocyanate in the above example to produce still other modified fatty oil products. For instance, ammonium iodide and other halide salts give advantageous oil products.

Further, as stated in Ser. No. 143,786, acids may be used in place of salts; both inorganic and organic acids and their salts being disclosed in that application as useful modifying agents in the processes described therein. That is, the polar compound employed as the modifying agent may be an acidic compound, either an organic or inorganic compound.

In other words, as stated in Ser. No. 143,786, I may use as the modifying agent, salts, acids and organic metal compounds, either separately or mixed. In the present invention I may do likewise and such compounds containing the following cations or anions or both, are advantageous:

as cations;

Ammonium
Sodium
Potassium
Lithium
Strontium
Calcium
Barium
Magnesium
Iron (ferric and ferrous)
Cobalt
Aluminum
Lead
Antimony
Manganese
Tin (stannic and stannous)
Cadmium
Bismuth
Zinc
Organic ammonium ions, etc.

as anions;

Naphthalene sulphonic (acid)
Carbonic (acid)
Tartaric (acid)
Oxalic (acid)
Acetic (acid)
Formic (acid)
Citric (acid)
Hydrochloric (acid)
Hydrobromic (acid)
Hydroiodic (acid)
Sulphuric (acid)
Sulphurous (acid)
Hydrosulphurous (acid)
Hydrosulphuric (acid)
Thiosulphuric (acid)
Nitric (acid)
Nitrous (acid)
Boric (acid)
Phosphoric (acid)
Hydrocyanic (acid)
Thiocyanic (acid)
Maleic (acid)
Salicylic( acid)
Phthalic (acid)
Sulphanilic (acid)
Naphthenic (acid)

Thus salts of inorganic and of organic acids may be used; both aromatic and aliphatic organic acids. Some are salts of monobasic acids and others of polybasic acids, particularly dibasic acids. Both neutral and acid salts may be used.

As described in my copending application Ser. No. 359,425, filed April 30, 1929, as a continuation in part of Ser. No. 143,786, further investigations enabled me to indicate some special features of particular series of examples of the main invention and to add valuable groups of modifying agents which are active in bringing about the changes described; all of which are fully described in said Ser. No. 359,425.

In that application, I give additional examples of particular natural resins and fatty oils which can be modified by my methods. As there stated, I have found that in the following series of oils, viz., Tung oil
Linseed oil
Castor oil
Fish oil (train oils)
Poppy-seed oil
Sunflower oil
Rapeseed oil
Walnut oil
Pipe oil
Corn oil
Olive oil the ease of transformation under equal conditions decreases in the order given; the first mentioned oil being most rapidly and readily modified. It should, however be mentioned, that modified oil products can also be readily obtained from even the last mentioned oils with suitable modifying agents.

As there stated, I have found that those modifying agents are most effective which according to Frumkin's method (see e. g. Z. physikalische Chemie, 1924, 109, 34–49 and later papers) impart a negative surface charge to a liquid in which they are dispersed.

Further, in Ser. No. 359,425, I disclose that in addition to salts and acids, I may also use organic polar compounds to modify fatty oils and other organic isocolloids. A large number of typical organic polar compounds are listed there as illustrative of those which are advantageous in my processes. Many specific embodiments of my generic invention are shown in that application.

As shown in Ser. No. 359,425 many different types of organic polar compounds may be employed in my processes. However, the organic polar compounds as a class are advantageous as there stated. As a class they are more readily soluble in the organic isocolloids generally and are soluble in many types of organic solvents, particularly the volatile organic solvents ordinarily used in making lacquers and varnishes and other coating compositions. Thus the organic polar compounds can be more easily incorporated in the organic isocolloids as the modifying agent and this is advantageous. For instance, in using organic polar compounds, the modification of the organic isocolloid may be effected at lower temperatures than given in the example ante; in many cases, at temperatures as low as 100° C. In some cases, even room temperature may be used, the materials being mixed cold as stated in Ser. No. 143,786. However, as stated in both Ser. Nos. 143,786 and 359,425, it is desirable and advantageous to heat the mixture to a suitable temperature until the desired modified product is obtained; the materials being melted or fused together. Generally temperatures between 100° and 300° C. give satisfactory products for most purposes. Of course, the temperature and time of heating depend upon the materials employed and the type of product desired.

This is particularly so with the organic polar compounds disclosed in Ser. No. 359,425. As there disclosed, the organic polar compounds may advantageously be salts of organic acids, salts of organic bases, organic acids, organic bases, metallic derivatives of organic compounds and other organic polar compounds which contain a group or groups imparting polarity to the organic compounds; those containing a plurality of such groups being advantageous.

An advantageous class of organic polar compounds, set forth in Ser. No. 359,425 (and in the continuations thereof, such as Ser. Nos. 446,170, 446,172, 446,174, etc. filed on April 21, 1930, and Ser. No. 188,014 filed Jan. 31, 1938) are the organic polar compounds comprising with the molecule an acidic inorganic residue and an organic residue (by an acidic inorganic residue I mean such an inorganic residue as can be converted by the addition of one or more hydrogens into an inorganic acid, including carbonic acid as inorganic). This class of organic polar compounds is a broad one and such compounds may be represented by the following generic formula $R-X_n$, wherein R represents the organic residue and X represents the inorganic acidic residue; the $n$ being 1 to 5. The acidic inorganic groups may be nitro, halogen, sulphur-containing radicles, carboxyl, etc. and one or more such groups may be present in the molecule and attached to the organic residue.

One advantageous class of these polar compounds are the organic halogen compounds, both aromatic and aliphatic, containing chlorine, iodine, bromine, etc. and the following compounds are typical and illustrative of this class:

o-Dichlorobenzene
p-Dichlorobenzene
Trichlorobenzene
Naphthalene tetrachloride
Naphthalene trichloride
Naphthalene hexachloride
Naphthalene monochloride
Nitro-chlorobenzenes, ortho, meta and para
Nitro-dichlorobenzenes
Chloro-dinitrobenzenes
Monochlorobenzene
Chlorinated diphenyl
Pinene hydrochloride
4-chloro-o-anisidine
p-Nitro-chloro-benzene
Triphenyl-chloro-methane
Benzyl chloride
Benzoyl chloride
Acetyl chloride
Acetyl bromide
Phthaloyl chloride
Trichloroacetic acid
Monochloroacetic acid
Chloral hydrate
Iodoform The halogen compounds listed ante and other halogenated aryl and aliphatic compounds, including acyl chlorides, chloro-acids, hydrochloride salts, etc. may be used in the practice of the present invention. And from the list given ante and as shown in my prior applications, such halogenated compounds may also contain other substituents in addition to the halogen, such as hydroxy, amino, nitro, alkyl, aryl and other groups. Accordingly such polar compounds may also be classified in the other groupings of these modifying agents as shown in my prior applications.

In fact, nitro compounds per se are useful and advantageous in the practice of the present invention. And nitro organic compounds are another advantageous class of organic polar compounds. The following nitro compounds are typical and illustrative of this class:

Nitrobenzene
o-Nitrophenol
p-Nitrophenol
Dinitrobenzene
Nitro-chloro-benzene
Dinitro-chlorobenzene
Dinitroaniline
p-Nitro-acetanilide
Nitrocresol carbonate
m-Nitroaniline hydrochloride
Ethyl thioether of 2-nitrobenzene
Ethyl thioether of 2:4 dinitrobenzene
Ethyl thioether of nitro-aminobenzene
2:4-dinitrobenzene
Nitro-aminobenzene These illustrate the various general types of nitro compounds which may be used in addition to the nitro compounds shown in the other classification of these polar compounds.

Another advantageous class of modifying agents or polar compounds are the aromatic sulphonic acids, together with their salts, esters and halides. Of these the sulphonic acids and the sulphonyl chlorides are particularly useful here. They are advantageous for modifying fatty oils, particularly linseed oil, castor oil, etc. and for resins.

These polar compounds may be represented by the following generic formula $R-SO_n-Y$, wherein R represents an aryl nucleus, Y represents hydrogen, chlorine or an alkyl group or a metal and $n$ is 0 to 4. Typical examples of such compounds are the following compounds:

Benzene sulphonic acid
p-Toluene sulphonic acid
2:5 dichlorobenzene sulphonic acid
m-Xylidine sulphonic acid
p-Toluidine-m-sulphonic acid
Naphthalene 2:6 sulphonic acid
Beta-naphthol 1:5 sulphonic acid
Beta-naphthol 3:6:8 sulphonic acid
Beta-naphthylamine 3:6:8 trisulphonic acid
2:1 naphthylamine sulphonic acid
2:6 naphthylamine sulphonic acid
2-phenylamine-8-naphthol-6-sulphonic acid
Methyl-p-toluene sulphonate
Ethyl chlorosulphonate
Benzene sulphonyl chloride
p-Toluene sulphonyl chloride
Naphthalene-1-sulphonyl chloride
Dimethyl sulphate
Diaminodihydroxy anthraquinone disulphonic acid.

Metal salts of such sulphonic acids, such as the sodium salts, are also useful here in the present methods. Specific embodiments of this phase of my invention are given in my prior applications Ser. Nos. 359,425 and 446,174. One such example is as follows:

*Example 2.*—150 parts of linseed oil are heated in vacuum to 280–310° C. for 5 hours with 7.5 parts of 2:5 dichlorobenzene sulphonic acid. A soft solid product is obtained, suitable for use as a base for the manufacture of varnishes. Another example is as follows:

*Example 3.*—100 parts of castor oil are heated together with 5 parts of 2:5 dichlorobenzene sulphonic acid in vacuo for 5 hours at 260° C. The product is a thick viscous oil, soluble in butyl acetate, in acetone and in benzene. It is useful in making lacquers, particularly nitrocellulose lacquers and coating compositions, such as leather cloth compositions.

Another advantageous class of polar compounds set forth in my Ser. 359,425 and useful in the present invention, are the organic esters of inorganic acids, both aryl and alkyl esters. The following are illustrative of this class:

Triphenyl phosphate
Tricresyl phosphate and other alkyl-phenyl phosphates
Nitrocresyl carbonate
Ethyl chlorosulphonate
Dimethyl sulphate In addition to these, other alkyl and aryl esters of inorganic acids such as borates, phosphates, phosphites, sulphides, sulphates, thiocyanates, etc. may be used; for instance, propyl, butyl, amyl and iso-alkyl esters. Likewise, esters of various aliphatic alcohols and phenols with organic acids may be used as shown post.

Still another class of modifying agents or polar compounds, set forth in Ser. No. 359,425 and useful in this invention, are the inorganic salts of organic bases, of which the following compounds are illustrative:

Diphenylamine hydrochloride
Diphenylamine hydrobromide
m-Nitroaniline hydrochloride
Trichloroaniline hydrochloride
Diphenyl amine sulphate
Diaminodiphenyl sulphate
Aniline sulphate
Amino-azo-benzene sulphate
4:4' diamine-diphenyl sulphide
Aniline hydrochloride Several of the above compounds in addition to being salts, also contain other groups which impart polarity to the compound, such as nitro, amino and halogen groups. Compounds containing such groups are useful per se, as stated ante.

As examples illustrative of organic salts of organic acids, there may be mentioned diphenylamine trichloroacetate and methyl p-toluene sulphonate. Other wholly organic salts may be used. For instance, the alkyl and aryl esters of the various organic acids mentioned ante, such as tartrates, oxalates, acetates, formates, thiocyanates, salicylates, etc., may be used in the present invention. These are illustrative of the esters of mono- and di-basic acids which may be employed.

Likewise, alkyl and phenyl esters of other aliphatic and aromatic carboxylic acids, both mono- and di-basic acids, such as phthalates, benzoates, acetates, abietates, oleates, laurates, palmitates, ricinoleates, etc. may be used. Both the mono- and di-esters of di-basic acids are useful here. Likewise mixed alkyl and aryl esters and alkylated phenyl esters can be employed in some cases. Typical examples are as follows:

Di-butyl phthalate
Mono-btuyl phthalate
Di-ethyl phthalate
Ethyl butyl phthalate
Di-phenyl phthalate
Ethyl-phenyl tartrate
Methyl abietate
Ethyl abietate
Di-ethyl succinate
Phenyl thiocyanate Ethyl malonate
Diethylammonium diethyldithiocarbamate
Ethyl salicylate
Methyl salicylate
Ethyl ether of ethyl salicylate
Butyl ether of ethyl ricinoleate That is, ether-ester and acid esters may be also employed here. Further, thioethers such as di-aminodiphenyl sulphide, may also be used; they being so to speak organic esters of organic mercaptans (R—S—H) which are more or less sulphur acids. Other useful organic sulphides are diphenyl sulphide, ethyl phenyl sulphide and the alkyl thioethers of nitrobenzenes, such as the ethyl thioether of 2-nitrobenzene or of 2:4 dinitrobenzene. That is, the phenyl group of such sulphides or thiothers may be further substituted with groups such as amino, nitro, etc.; these groups increasing the polarity of the molecule.

Many of the polar compounds illustrated ante in the various classifications also contain amine or amino groups. In the present invention amine compounds as a class are useful. My prior application Ser. No. 446,170, Patent No. 2,234,949 is primarily directed to modifying fatty oils and other organic isocolloids with amine compounds as the polar compound or modifying agent. As there disclosed, amines having a relatively high molecular weight are advantageous.

In the present invention, as in the methods of my prior Ser. No. 446,170, compounds containing primary, secondary or tertiary amine groups and containing one or more of such amine groups may be used as the modifying agent; those containing two such groups being advantageous. Any and all of the specific amine compounds disclosed in Ser. No. 446,170 and my other prior applications may be used in the practice of the present invention.

One of the advantages of the amines as modifying agents is that they are relatively easier to dissolve or disperse in fatty oils and other organic isocolloids to modify them.

The amines may be used by themselves or in conjunction with other modifying agents, etc., in modifying organic isocolloid materials according to the present invention. For instance, the amines may be used in conjunction with polar compounds comprising within the molecule an acidic inorganic residue and an organic residue, such as given ante. Sometimes they may be used with certain auxilary materials, as shown in Ser. No. 446,170 and other of my prior applications. Again, it is sometimes advantageous to use as the modifying agent, an organic polar compound containing both an amine group and an acidic residue, such as the aromatic amino sulphonic acids and other compounds of that type shown ante. That is, the various amines and procedures disclosed in Ser. No. 446,170 may be used in the practice of the present invention.

In addition to the amines, I may also use other organic bases as modifying agents in the present processes. Many such organic bases are disclosed in my prior applications; for instance, naphthols, phenols, etc. as described in my prior applications Ser. Nos. 143,786, 359,425, 446,174 and 188,014. In Ser. No. 188,014 many typical and illustrative organic bases are listed and all of them are useful here. As shown in those applications, a wide range of organic bases may be used, according to the type of modified product desired.

The direct use of organic bases, such as arylhydroxy compounds, as the modifying agent, is disclosed in my prior Ser. No. 446,174 wherein the use of nitrophenols is specifically claimed. However, in most embodiments of the present invention, such organic bases are used in conjunction with other modifying agents, they being employed to give an additional modification in the properties of the products obtained, as pointed out in my applications Ser. Nos. 143,786, 359,425, and 446,174. The organic bases may be used here in conjunction with metal salts, acids, acid chlorides (acyl chlorides) etc. employing the proportions and procedures shown in said prior applications. As stated ante, such polar compounds are advantageous modifying agents when used alone.

In fact, the acids are an important class of polar compounds and may be used alone as the modifying agent in the practice of the present invention. Certain of the advantageous acids, particularly the organic acids, have been described ante. In addition to those disclosed in my Ser. Nos. 143,786 and 359,425, any and all of those listed in my Ser. No. 188,014 may be used in the present invention; the inorganic as well as the organic acids. In connection with the salts and esters, I mention many acids and these are suitable for use here in the form of the free acid as well as in the form of metal salts and esters. As mentioned ante, acid salts and acid esters may be used and these so to speak are partly neutralized acids; that is, they are of acid character. Also the anhydrides and acid chlorides of these acids are useful here as the modifying agent. As shown ante, the metal salts of these acids may be used as the polar compound, here.

Also in Ser. No. 359,425 and the other continuations of Ser. No. 143,786, notably my Ser. No. 446,174, I have given many specific examples of metal salts, both neutral and acid salts, which are advantageous in the practice of the present invention, particularly for modifying fatty oils and natural resins. Some of these are as follows:

Ammonium iodide
Cadmium iodide
Zinc bromide
Barium thiocyanate
Potassium thiocyanate
Ammonium chloride
Magnesium chloride
Magnesium sulphate
Sodium sulphate
Sodium hydrogen sulphate
Di-sodium hydrogen phosphate
Sodum bisulphite
Sodium sulphite
Lithium sulphite
Lithium carbonate
Zinc carbonate
Sodium sulphide
Barium sulphide
Lead chromate
Potassium dichromate
Cadmium sulphide
Sodium bicarbonate
Tin carbonate
Tin sulphite
Tin sulphide
Tin chloride (stannous and stannic)
Antimony sulphide
Zinc sulphide
Barium sulphide
Barium carbonate Calcium sulphite
Strontium sulphite
Magnesium sulphite
Barium sulphite
Lead sulphite
Cadmium sulphite
Mercuric sulphate The above are advantageous salts, but other metal salts may also be employed, either alone or in conjunction with other agents.

The polar compounds here useful as modifying agents may be classified in various ways according to the groups present in the molecule. The following is one broad classification of such polar compounds:

Metal salts of inorganic acids
Metal salts of organic acids
Organic salts of organic acids
Organic salts of inorganic acids
Organic bases
Organic acids
Inorganic acids
Organic halogen compounds
Organic nitro compounds
Organic sulphonic compounds
Metallo-organic compounds Most of these modifying agents are organic polar compounds, as is evident from the classification given ante.

The amount of modifying agent, to wit, the polar compounds such as shown ante, used in my processes is a minor amount by weight on the organic isocolloid; an amount not exceeding 30 percent. Generally from 1 to 30 percent of the polar compound is used. However, in some cases less than 1 percent gives desirable improvements in the oil; sometimes as little as 0.01 percent being used. An advantageous range is from 0.01 to 10 percent of polar compound on the fatty oil. Generally I find that the amount of modification of the final products increases with the amount of polar compound used, when the other conditions are the same.

The modifying agents should be added to the starting material in dry form (without the presence of water) and in relatively small quantities. In order to ensure complete dissolution or dispersion of the modifying agent, the operation of dissolving or dispersing the latter should be carried out under application of heat. The temperature necessary depends upon the nature of the substance under treatment and also of the modifying agent used. Generally temperatures from 100° to 300° C. give satisfactory results. The heat treatment promotes the complete (molecular or colloidal) dissolution of the modifying agent in the substance to be treated. In some cases it may be advisable and advantageous to continue the heating after the dissolution or dispersion of the modifying agent is substantially complete. This is advantageous in modifying fatty oils at temperatures of 250° to 300° C. with these polar compounds, for by continuing the heating several hours the oil is also heat-bodied and I obtain modified, heat-bodied fatty oil products particularly useful in making varnishes.

I have further found that the results of these processes vary with the pressure employed and with the nature and/or with the physical condition (pressure) of the gas (air or other gas) present in the reaction chamber. Thus I have found that certain given starting material which is initially liquid will become viscous only as the result of the electrolyte treatment, if the latter is effected under atmospheric pressure (e. g. in an open vessel), but solid if the gas is rarified by the employment of a partial vacuum. In other cases, the converse applies. When plus pressure was used (e. g. caused by the tension of the starting material at higher temperatures), the results differ again from both of those of the treatments under atmospheric pressure and vacuum. Also, as to the nature of the gas present, air gives for instance a different result from another gas or mixture of gases. The pressure conditions may be alternated during the gas treatment, which, of course, may be carried out together with the dissolution or dispersion of the modifying agent in the substance to be treated or as an after treatment.

It may be stated with reference to the action of gases that generally speaking rarification of the gases present in the reaction chamber by reduction of pressure tends to intensify their action in the process both in the case of solidification of the starting material and also in the case of liquefaction thereof.

The gas treatment may be carried out by blowing the gas through the mixture or simply by passing it over the mass contained in the vessel. The gas may be hydrogen, nitrogen, carbon dioxide, hydrogen sulphide, sulphur dioxide, etc. and a current of such gases passed through the oil during the heating. In this way the bodying is facilitated as described in my prior applications. The gas may also be produced in situ in the mixture by using substances which under the conditions employed develop these gases, if desired. For instance, by using peroxides, carbonates, sulphides, sulphites and the like, the corresponding gases may be developed in situ during the heating.

My processes, as described ante and in my prior applications, may be made to effect a solidification or a liquefaction of the initial material. Thus, for instance, thickened products and even solid substances may be obtained from thin oils. Similarly I have found that resins either soft or liquid or of any intermediate stage of viscosity may be obtained from solid resins. The results, namely, solidification on the one hand, or liquefaction on the other, depends in any given case upon the conditions used, e. g. upon the time and temperature of heating, the gas treatment, the quantity of dissolved modifying agent, etc. Generally speaking the products obtained were, from liquids, solids or semi-solid thermoplastic masses, and from solids, pasty or thin liquids.

If desired the modifying agent may be produced in situ within the organic isocolloid under treatment by interaction within the substance, of compounds capable of reacting under the conditions of the process to produce the modifying agent desired.

The dissolution or dispersion of the modifying agents in the starting material may be favorably influenced by the addition of certain "auxiliary agents" or "sensitizers." These fall into two groups, namely, the purely inorganic agents such as silica gel, fuller's earth and other clays and the purely organic agents such as formaldehyde, phenol, thiocarbanilide, hexamethylenetetramine, 2:3 hydroxynaphthoic acid, alphanaphthol, quinoline, pyrogallol, benzene, glycerol and phthalimide. The specific examples of auxiliary agents here mentioned are to be taken as typical of the substances which have been successfully used for this purpose and not as comprising all the effective substances. It should be mentioned that quite a number of the modifying agents comprising within the molecule an acidic inorganic residue and an organic residue are also useful as auxiliary agents (sensitisers) when used in conjunction with other modifying agents. Thus, e. g. the dissolution of 5% of sodium bisulphite in linseed oil is facilitated and the color of the product is made lighter by the addition of say 2% of an auxiliary agent such as amino-azobenzene sulphate, aniline sulphate, nitrocresyl carbonate, dimethyl sulphate, trichloracetic acid, benzene sulphonic acid, iodoform, naphthalene tetrachloride, pinine hydrochloride, m-xylidine-sulphonic acid, beta-naphthylamine-6:8-disulphonic acid, beta-naphthylamine 6 sulphonic acid, acetyl chloride, p-nitro-acetanilide, chloral hydrate, triphenyl phosphate, naphthalene-1-sulphochloride, diphenylamine hydrobromide, aminosalicylic acid, 2:6 naphthalene disulphonic acid, o-chlorobenzene.

The advantage of a rapid dissolution of the modifying agent are greatest in those cases where a clear, pale or colorless product is desired, especially for example in the varnish industry.

For the modification of the physical properties of the initial materials, solutions or colloidal solution of one or more electrolytes in an organic solvent may be used, as stated in my prior applications.

In all cases the treatment may be advantageously influenced by exposing the materials undergoing treatment to oscillating energy (X-rays, ultraviolet rays, infra-red rays, etc.) or by including the vessel in an electric circuit.

Filling materials, pigments and the like may be added at any stage of the process.

All of the description given ante as to my processes and the materials used therein is set forth in my prior applications wherein such methods are fully illustrated with many specific examples.

In the present invention, I employ similar polar compounds and procedures for modifying the same types of organic isocolloid materials, particularly fatty oils, to obtain modified isocolloid products for my improved coating compositions to which the present application is directed. That is, I may use any of the modified products disclosed in my prior applications in making the lacquers, varnishes and other coating compositions of the present invention, they being dissolved in suitable organic solvents and blended with other materials as shown post.

As stated in my Ser. No. 446,174, I have found that the solubility in organic solvents of my fatty oil products and other modified organic isocolloids, obtained by the processes set forth ante and described in detail in my prior applications, vary quite markedly and in part depend upon the particular polar compound employed. As there stated, I have found that when my modified products are made with the aid of a polar compound which itself is insoluble in certain organic solvents, the modified product so obtained is also insoluble or difficultly soluble in those particular solvents.

On the other hand, as also stated in that application, I have found that if the polar compound employed is itself soluble in certain organic solvents, the modified products made with it are likewise soluble in the same solvents. For instance, ammonium iodide or other polar compounds soluble in acetone produce modified castor oil products which are also readily soluble in acetone, as disclosed in Ser. No. 446,174. Such modified products, being soluble in acetone, can be incorporated with solutions of nitrocellulose to obtain improved nitrocellulose compositions as there disclosed.

Thus in preparing my coating compositions, one method of the present invention is to heat the fatty oil with a polar compound which itself is soluble in the organic solvent or solvents to be used in such composition. Then the modified fatty oil so produced and containing such polar compound dissolved or dispersed therein, is dissolved in the matched solvent to obtain the desired solution. This simple method is advantageous and can be used with any of my modified oil products produced with the aid of polar compounds which themselves are soluble in varnish and lacquer solvents, such as benzene, acetone and other ketones, butyl acetate and other ester solvents, methyl alcohol and other alcohols, etc.

Also, my modified products, made with a polar compound insoluble in such solvents, and which cannot be directly used to prepare solutions in such solvents, can be made soluble in them by a subsequent treatment. In this subsequent treatment, the insoluble modified oil product is fused with a minor amount of an organic compound which is soluble in such solvents. The fused material so obtained can now be dissolved in the said solvent or solvents and useful coating compositions obtained. This method can be also used to improve the solubility in varnsh and lacquer solvents, of unmodified organic isocolloids which are naturally difficultly soluble in these solvents. In either case, my polar compounds which are soluble in the said solvents may be used to so improve the solubility of these isocolloids, both the modified ones and the unmodified or natural ones.

The two step method ante for making soluble modified oil products, by first using an insoluble polar compound as the primary modifying agent and then a soluble compound to convert the insoluble oil product into a soluble one, may be simplified into a single step method by adding both the insoluble and the soluble compounds to the oil in the beginning; both the primary modifying agent and the secondary or solubilizing agent being present during the initial heating.

All three of the above methods for making soluble oil products are given in my Ser. No. 446,174 and other prior applications set forth ante. In my Ser. Nos. 466,587 and 188,014, I also describe methods wherein a fatty oil is first bodied without the addition of a polar compound and then the bodied oils so obtained are heated with a polar compound to modify them. Many of the polar compounds used in those processes are soluble in varnish and lacquer solvents and the product obtained with them are useful in making the present coating compositions.

In the fields of protective coatings and plastics it is very desirable to produce bodied fatty oils of predetermined solubility properties, or to obtain solutions of such bodied fatty oils in solvents in which they are insoluble.

I have now found that the solubility of a fatty oil, whether bodied or not, in a certain solvent or solution of other materials may be greatly influenced and improved by dispersing in these oils or oil products certain agents the characteristic feature of which is their solubility in the medium in question. As mentioned hereinbefore the medium may be either a solvent or a mixture of solvents and/or diluents or a solution of another film forming agent or agents in solvents or solvent mixtures. I am thinking primarily of cellulose ester or cellulose ether solutions, such as nitro-cellulose, acetyl-cellulose, ethyl cellulose, benzyl cellulose solutions, of on solutions of chlorinated rubber, of vinyl resins, of methacrylate resins, of styrene resins and further also in varnish resin and varnish oil solutions, amongst others.

The present invention accordingly comprises a process for the modifying or influencing the solubility of fatty oils, wherein bodied or not bodied fatty oils undergo a treatment with certain agents which shall be called "dissolution promoting agents." This dissolution promoting agent is to be dissolved or dispersed in the fatty oil to be treated. The dispersion or dissolution of these agents may be ensured by the application of heat and the process can be carried out under atmospheric pressure, or under reduced pressure or under plus pressure. The agents may be added in form of solutions. In the latter case the solvents may be distilled off to obtain nonvolatile oil products. If modified fatty oils are to be treated, the solution promoting agent may be added either in the modifying process itself or after the oil products have undergone the modifying treatment. These methods are useful in the alternative that the modifying agent itself is insoluble in the solvent or solvent mixture or solution, in which the fatty oil has to be dissolved. Certain dissolution promoting agents may be chosen from the class of modifying agents. If the modifying agent is soluble in the solvent or solvent mixture or solution in question, it is possible to produce modified heat bodied fatty oil products with the desired solubility properties. In such an event the modifying agent itself is acting as dissolution promoting agent. It is possible of course to use several agents simultaneously, which each act as dissolution promoting agent and of which some may act as modifying agent also.

The invention further consists of making protective coatings and plastics, containing such fatty oils of predetermined favorable solubility properties on one hand and another film forming agent or agents on the other hand, such as cellulose esters, cellulose ethers, chlorinated rubber, oleo-resinous varnishes, amongst others.

The dissolution promoting agents, according to my invention, may be classified in the following groups: (A) Such which are modifying agents themselves and (B) such which are not modifying the viscosity of fatty oils when heated with them at bodying temperatures. The group A, representing the modifying agents, being themselves well soluble in the media in question, may be subdivided into (1) inorganic and (2) organic agents. The inorganic dissolution promoting modifying agents require higher bodying temperatures for their dispersion in the fatty oils. Usually 250° C. is the lowest temperature limit and the decomposition temperature of the oil is the upper limit. Practically 290° to 310° C. yield satisfactory products, in the most cases. The organic dissolution promoting modifying agents belong to the class which consists of an organic residue and an inorganic residue and which may develop on the action of heat in the oils acids, or which consist of organic amines or amino compounds. The organic dissolution promoting modifying agents dissolve at much lower temperatures in the fatty oils, than the inorganic dissolution promoting modifying agents. Some may be dissolved at room temperature, others at temperatures below 200° C. Only very few organic dissolution promoting agents require higher temperatures than 200° C. for their dissolution or dispersion. If it is desirable that the dissolution promoting organic modifying agents should have a bodying action, then it is necessary to heat the oil to bodying temperatures, which is usually above 200° C. and in most of the cases even above 250° C., with the temperature range of 270° to 320° C. being the mostly used one. If the dissolution promoting modifying agent should only perform the promotion of the dissolution of the fatty oil product in question in the different media above referred to, then the heating to bodying temperatures may be omitted and the process is concluded with the dispersion of the agent in the oil. The latter types of agents, in addition to promote dissolution, may be used in addition to such inorganic agents or also to such organic agents which are insoluble in the organic solvents, or they may be used alone or in admixture with other dissolution promoting agents.

The group B representing the dissolution promoting agents which themselves have no appreciable modifying action on the viscosity of fatty oils at bodying temperatures, are mostly organic compounds and may be used, like the organic dissolution promoting modifying agents, either alone or in admixture with modifying agents, which themselves are not soluble in the organic solvents in question. They may be heated with the oil to bodying temperatures or they may be heated with the oil only until dispersion occurs. The oil to be treated with group B may be a modified or a not modified fatty oil.

According to the present process vegetable or animal oils may be treated. Synthetic resins of the fatty acid containing types of alkyds, etc., and synthetic oils, like synthetic fatty oil esters may also be treated. From the point of view of this invention such above mentioned synthetic resins and synthetic oils behave and count as fatty oils.

It is remarkable that even in such cases when the dissolution promoting agent partially evaporates or decomposes or forms some new chemical compound during the reaction of the heating process, its original behavior in solvents seems to show up in the resulting fatty oil product.

With regard to proportions to be used 0.1% to 10% by weight, based on the oil product, are the practical limits. Usually 2% to 5% produce very satisfactory results.

The importance of this invention can be illustrated if a few practical examples are considered. Most thickened fatty oils, for instance, are insoluble in acetone but if I incorporate in them dissolution promoting agents soluble in acetone, I obtain products which are acetone soluble independently of their melting point or viscosity. (The melting point and viscosity is, in the case of unmodified bodied oils, inversely proportional to their solubility.) Further I have found that the harder a solidified linseed oil product is, e. g., the more quickly do the varnishes, made of these oil products dry. The harder solidified oils, the melting points of which are higher, yield in the most cases very viscous solutions in their solvents. For certain technical purposes it is important sometimes in the varnish trade to have oil solutions with low viscosity. According to the present invention, if I incorporate a dissolution promoting agent, soluble in the particular solvent or solvent mixture in question, I may obtain comparatively mobile solutions even from hard modified oils. In the above mentioned processes, besides the primary modifying agents, which are necessary to bring about any modification of the fatty oils, secondarily a dissolution promoting agent may be incorporated, which itself does not modify the oil, but which influence the physical properties, and especially the solubility properties of the resulting product when used in connection with the primary modifying agent.

A further practical example is the incorporating of fatty oils into nitrocellulose solutions for the manufacture of leathercloth or for the manufacture of lacquers.

In the manufacture of artificial leather or leathercloth fatty oils are used as softeners, acting at the same time as an extender of nitrocotton, to reduce cost of the film to be produced. The nitrocellulose is more expensive than the fatty oils. Most oils however flocculate the nitrocotton from its solution. This flocculation may be due to incompatibility with the nitrocellulose, or as it is more often the case, it is due to reduced solubility of the oil in the nitrocellulose solvents, or solvent mixtures, or thinners. Only castor oil has been found as suitable for plasticizing nitrocellulose films in larger proportions. Besides the fact that castor oil belongs to the higher priced oils and other oils, like linseed oil, soyabean oil, fish oil, if could be made suitable, would be less expensive, the castor oil has drawbacks which may also be improved.

The drawbacks of castor oil are as follows: (1) It cannot be used in larger proportions than 2 to 1 part of nitrocellulose. If more oil is used, the film gets tacky and looses strength. (2) Castor oil sweats out (perspires) from leathercloth at elevated temperatures, e. g. near a fireplace or radiator, especially if it is present in substantial quantities in the film. Finally (3) castor oil shows bad ageing properties in leathercloth. All three drawbacks can be improved if a modified castor oil is used. A heat bodied castor oil, especially the solid ones, do not sweat out of leathercloth or other films and because of their hardness or high viscosity, have less plasticizing effect than raw castor oil has on nitrocellulose. Thereby films with dry appearance can be made with higher proportions than 2 parts of oil to 1 part of nitrocellulose, parts being parts by weight.

Further according to the present invention it is possible to make a suitable plasticizer for nitrocellulose out of other less expensive and domestic oils, such as linseed oil, soyabean oil, fish oils, amongst others. Most modified linseed oil products, e. g. are insoluble in solvents for nitrocellulose and flocculate therefore the nitrocotton right away from its solutions. When however a dissolution promoting agent is used either as modifying agent or in addition to a modifying agent, it is possible to produce suitable oil products with improved properties. The dissolution promoting agent used, should be soluble in the solvent mixture of the nitrocellulose, as applied.

A harder oil with higher melting point has generally a less softening action on cellulose esters than raw castor oil. Therefore if such an oil is used in a greater than 2:1 proportion with nitrocotton, the resulting film will show satisfactory properties, not having surface tack. Oil products with higher melting point have naturally reduced perspiration tendency if any. It is further possible, by choosing suitable dissolution promoting agents as modifying agents or in addition to such, to improve the ageing properties of the leathercloth products. Dissolution promoting agents, which when added in the proportion of 2% of the weight of the oil to a solidified linseed oil, which has been solidified with 5% $NaHSO_3$, will improve the ageing properties of the product, are e. g., alpha-naphthol, pyrogallol, p-aminophenol hydrochloride, benzoyl chloride, cinnamic aldehyde, benzene sulphochloride, p-toluol sulphochloride, and also the inorganic thionyl chloride.

Nitrocellulose lacquers have many advantages over oil varnishes, but their most important drawback is the cost of their production. The replacing of some of the nitrocellulose with the less expensive fatty oil products is a great advantage. A further problem with the nitrocellulose lacquers is that they have lower solids than varnishes. A clear furniture lacquer of high quality may have 24% to 30% solids in shipping consistency and 15 to 20% solids at spraying consistency. A furniture varnish may be shipped with 50% solids and in spraying consistency it may have 40 to 45% solids. For this reason the filling qualities of varnishes are better than those of the lacquers. With lacquers more coats are needed to produce quality finishing than with varnishes. By the addition of the more or less heavily bodied fatty oil products to the lacquer, it is possible to produce deep looking and good filling lacquer finishes. Such bodied oil products must however have the satisfactory solubility properties in the lacquer solvent combination as applied. The high viscosity or solidity of the fatty oil permits the addition of larger proportions of oils to the nitrocotton, without imparting too much softness to the film and cause simultaneously a deep looking effect, i. e. the film looks like a heavy layer, in contrast to the thin looking single coat of a regular lacquer. As most oil products which are satisfactory in varnishes, will flocculate the nitrocotton and are insoluble in lacquer solvents, the problem is not simple. According to the present invention however it is possible to produce a wide range of modified oil products, which can easily be mixed with nitrocellulose and which yield satisfactory lacquers.

A further important feature of my invention is to prepare low viscosity solution of modified bodied oil products in varnish solvents, which otherwise yield very highly viscous solutions in the same solvent, necessitating further dilution for brushing or spraying purposes. Such solidified oil products yield fast drying varnishes, but their regular solutions are so viscous that when diluted to brushing consistency or to spraying consistency their solids are again very much reduced. By dispersing dissolution promoting agents in such oils, (e. g. in an aftertreatment at low temperatures), low viscosity solutions are produced with higher solids.

My invention is illustrated but not limited by the following tables and examples, the parts being by weight.

TABLE I

*The solubility of modifying and/or dissolution promoting agents in certain organic solvents*

| Type of reagent | Solvents | | | |
|---|---|---|---|---|
| | Acetone | Methyl alcohol | Benzol | Butyl acetate |
| *Inorganic modifying and simultaneously dissolution promoting agents* | | | | |
| Sodium iodide | S | S | I | I |
| Sodium bromide | I | Sl. S | I | I |
| Ammonium iodide | Sl. S | S | S | Sl. S |
| Calcium oxalate | Sl. S | S | S | Sl. S |
| Zinc acetate | I | Sl. S | I | I |
| Magnesium chloride | I | S | S | S |
| Zinc bromide | S | S | I | I |
| Potassium sulfide | Sl. S | Sl. S | I | I |
| Sodium thiosulfate | I | S | S | I |
| Aluminum carbonate | I | V. Sl. S | S | V. Sl. S |
| Strontium sulfide | I | V. Sl. S | I | I |
| *Organic modifying and simultaneously dissolution promoting agents, basic* | | | | |
| Urea | I | S. C | I | S. H |
| Meta-xylidine | M | M. C | M. C | M. C |
| Benzidine base | S | S | S | S |
| *Acidic, or containing acidic residues* | | | | |
| Benzoic acid | S. C | S. C | S. C | S. C |
| H. salt | I | I | | Sl. S |
| Sulfanilic acid | I | I | | Sl. S |
| Amido-G-salt | I | I | | Sl. S |
| Beta-oxynaphtoic acid | V. S. C | V. S. C | | V. S. C |
| Meta-xylidine sulfo acid | I | S. C | | M |
| Dimethyl sulfate | M | M | | M |
| Phthalic anhydride | S. C | S | S | S |
| Monochlor acetic acid | S. C | S. C | S. C | S. C |
| 2:6 naphtalin disulfo acid | I | Sl. S | I | I |
| Tobias acid | Sl. S | S | S. C | I |
| p-Dichlorbenzene | S. C | S. C | S. C | S. C |
| Fluoresceine | Sl. S | S | I | I |
| o-Nitrophenol | S. C | S | S. C | S |
| Dinitraniline | S. C | S | Sl. S | S. C |
| p-Toluol sulfo acid | S. C | S. C | I | S |
| 2:5 dichlorbene sulfo acid | S. C | S. C | Sl. S | S |
| Triphenylphosphate | S. C | S. C | S. C | S. C |
| p-Aminophenol hydrochloride | I | S | I | I |
| p-Toluidine m-sulfo acid | Sl. S | S | I | I |
| p-Toluol sulfo chloride | S. C | S. C | S. C | S. C |
| o-Dichlorbenzol | M. C | M. C | M. C | M. C |
| p-Nitro acetanilide | Sl. S. C | S. C | Sl. S | Sl. S |
| Do | S. H | | | |
| p-Chlor o-anisidine | S | S | S | S |
| p-Nitrophenol | S. C | S. C | S | S. C |
| *Nonmodifying organic dissolution promoting agents* | | | | |
| Alpha-naphtol | S. C | S | S | S |
| Pyrogallol | S. C | S. C | S | S. C |
| Glucose | I | S | I | I |
| Phenol (carbolic acid) | S. C | S. C | S. C | S. C |
| Resorcinol | S. C | S. C | S | S. C |
| p-Cresol | S. C | S. C | S. C | S. C |
| o-Cresol | S. C | S. C | S | S. C |

S, soluble; C, in the cold; I, insoluble; Sl. S, slightly soluble; V, very; M, miscible.

*Example 4.*—100 parts of castor oil are heated together with 5 parts ammonium iodide in vacuo of 100 mm./Hg pressure for 5 hours at 260° C. A dark colored soft paste is obtained which is soluble in acetone. Ammonium iodide is soluble in acetone. Ammonium iodide causes good solubility in many lacquer solvents, whereas replacing ammonium iodide with the acetone insoluble lithium carbonate as modifying agent, the resulting product has no solubility in acetone.

*Example 5.*—100 parts of castor oil modified by five parts of barium thiocyanate under the conditions of Example 1, yields a brown mobile oil which is soluble in butyl acetate and benzol. Barium thiocyanate is soluble in butyl acetate and is moderately soluble in benzene. Increased temperature and duration of heating increases the viscosity of the oil product. In case of more viscous oils prepared with the same modifying and dissolution promoting agent, the solubility is somewhat reduced, but the action of the dissolution promoting agents is still pronounced.

*Example 6.*—100 parts of castor oil is treated with 5 parts of cadmium iodide as described in Example 1. (A viscous oil is obtained which is acetone soluble, as is cadmium iodide itself.)

*Example 7.*—100 parts of castor oil are treated with 5 parts of zinc bromide at 250° C. in vacuum of 100 mm./Hg pressure. After the heating proceeded properly the oil gels in vacuum. Therefore it is advisable to reduce the amount of zinc bromide to 2 parts, to heat to 200° C., to hold there for 2 hours, heat in further 20 minutes to 230° C. and to hold there for 3 hours. The product is a viscous brown oil, soluble in acetone as well as in butyl acetate. The reagent itself is also soluble in these solvents. If the reaction is repeated in open containers under atmospheric pressure, the product is thicker and is in the cold an elastic solid. It has still good solubility properties in the solvents in which zinc bromide is soluble.

*Example 8.*—100 parts of castor oil, 2 parts of lithium carbonate and 5 parts of beta-naphthol are treated in the manner described in Example 1. Temperature of 200° C. is reached in 20 minutes. This temperature is held for 3 hours, the temperature raised to 250° C. and held for 6 hours. The product is a soft pasty light brown solid, having good solubility properties in lacquer solvents. If in this example castor oil is replaced by linseed oil, and the temperature raised in the last 6 hours to 290° to 300° C., a more solid product is obtained, with satisfactory solubility properties. Soyabean oil yields softer products and fish oil pasty products of medium consistency.

*Example 9.*—100 parts of castor oil is treated with 5 parts of 2:5-dichloro-benzenesulfonic acid, as described in Example 1. The product is a thick viscous oil, soluble in butyl acetate, acetone and benzene. The reagent itself is also soluble in those solvents. If instead of 2:5-dichloro-benzenesulfonic acid other dissolution promoting modifying agents are used, the following results are obtained: benzidine base yields a semisolid, p-nitrochlorbenzene a thin brown oil, dichlorbenzene yields a mobile light oil. If p-cresol is used as nonmodifying dissolution promoting agent alone, a clear viscous oil is obtained with similar consistency, than castor oil when heated under similar conditions. All products have good solubilities in the above three solvents and also in other lacquer solvent mixtures.

*Example 10.*—When 100 parts of linseed oil is treated with 3 parts of calcium peroxide and 3 parts of zinc sulphite at 290 to 300° C. in the way as described in Example 1, a tough solid results upon cooling, which may be used as varnish base, e. g. with lime hardened rosin as resin constituent. If varnishes with the usual no volatile content are prepared with this material very viscous solutions result, which ought to be further diluted to be useful for brushing or spraying purposes. Very dilute solutions with low solid content are not liked by users, as the resulting films are very thin and a considerable number of coats would have to be applied to obtain satisfactory coating thickness. If e. g. 4 parts of p-nitrophenol or 4 parts of benzoic acid are dispersed in the above linseed oil product by the aid of heat, heating the mixture only to the point when it yields a homogeneous mass, on cooling a product is obtained which yields in turpentine much less viscous solutions than the original product. P-nitrophenol, o-nitrophenol and benzoic acid are soluble in turpentine.

Instead of castor oil or linseed oil in the above examples, other oils or resins may be treated in a similar way. Examples for such oils are: tung oil, soyabean oil, fish oils, sunflower oil, perilla oil, oiticica oil, etc. Examples for the resins are alkyd resins containing fatty acids or fatty oils as resin ingredients. The resins are usually more readily soluble in nitrocellulose solvents, than oils.

*Example 11.*—To manufacture a dope suitable for leathercloth manufacturing 20 parts of a 25% nitrocellulose solution in acetone or ethyl acetate is used. To this quantity of solution 10 parts of oil product is added. The oil should be gradually stirred into the nitrocotton solution. If the oil is too heavy, it may be dissolved in a part of the diluent. The nitrocellulose is usually a 5 to 10 seconds quality. About 50 parts by volume of diluent is needed to 100 parts by volume of the combined oil-nitrocellulose mixture. As diluent isopropyl or ethyl alcohol may be used, containing 10% of amyl acetate. The latter is a good mutual solvent of oil and nitrocellulose and secures uniform drying. The diluent should be added gradually. Modified castor oil products with good solubility properties in lacquer solvents may be used, such as the ones treated with ammonium iodide, ammonium chloride, benzidine base, lithium sulfite plus carbolic acid, lithium carbonate plus p-cresol, 2:5-dichlorobenzene sulfonic acid, barium thiocyanate plus p-cresol, p-nitrophenol. A heat bodied castor oil, containing p-cresol as dissolution promoting agent alone yield also satisfactory results. As the alcohols are usually bad solvents for bodied oils, coal tar hydrocarbons may be well used as thinners. If during preparation the nitrocellulose precipitates, addition of ester type solvents, such as amyl acetate, butyl acetate, ethyl acetate may correct the trouble. The higher boiling esters are usually better solvents for oils. Other mutual solvents may also be used. P-toluol sulfonic acid yields also satisfactory properties.

*Example 12.*—100 parts of nitrocellulose, 20 parts of tricresyl phosphate, 100 parts of castor oil product of Example 6, containing 2:5 dichlorbenzol sulfonic acid, 100 parts of rosin-glycerine-ester (ester gum) and 100 parts of a long oil castor oil alkyd resin are dissolved in a 40 to 50% amyl acetate and 50 to 60% coal tar hydrocarbon (such as toluol or xylol) containing solvent mixture to a total solids of 20 to 25%. The resulting lacquer is a satisfactory wood lacquer, having good filling qualities, but not suitable to rubbing.

Many of the above examples yield satisfactory compatibility in chlorinated rubber varnishes, ethyl cellulose lacquer, etc. Good solubility may also be obtained in tetra chlor ethane and similar solvents. Methyl ethyl ketone, butyl alcohol, isopropyl alcohol, glycol ethers are amongst the other important solvents, in which good solubility may be obtained.

TABLE II

*List of experiments to modify castor oil and to influence solubility of bodied oils*

[This is an incomplete but demonstrative list]

| Inorganic modifying agents | | Plus organic dissolution promoting agents |
|---|---|---|
| Soluble in organic solvents alone | Insoluble in organic solvents alone | |
| Barium thiocyanate | | $Li_2CO_3$ plus p-cresol |
| $HgCl_2$ | | $Li_2SO_3$ plus p-cresol |
| NaI | | $Li_2SO_3$ plus phenol |
| NaI plus HCOOH | | $Li_2CO_3$ plus phenol |
| $NH_4I$ | $K_2SO_3$ | $Li_2CO_3$ plus alpha-naphthol |
| $CdI_2$ | $Li_2CO_3$ | $Li_2CO_3$ plus beta-naphthol |
| $ZnBr_2$ | $Li_2SO_3$ | $Li_2SO_3$ plus beta-naphthol |
| $MgCl_2$ | $SrCO_3$ | $Li_2SO_3$ plus alpha-naphthol |
| NaBr | $MgCO_3$ | |
| $BaCl_2$ | Na-acetate | |
| $NH_4Cl$ | NaCl | |
| $HgBr_2$ | NaCl plus HCOOH | |
| $SnCl_4$ | $Al_2(SO_4)_3$ | |
| $ZnCl_2$ | $NaHSO_3$ | |
| $BiCl_3$ | $NaHSO_4$ | |
| | $KHSO_4$ | |
| | $KHSO_3$ | |

| Organic modifying agents, soluble in organic solvents |
|---|
| 2:5 dichloro-benzol-sulfonic acid |
| o-Nitrophenol |
| p-Nitrophenol |
| Benzidine base |
| p-Nitro chlorbenzene |
| p-Nitro phenol, and p-cresol |
| o-Cresol |
| p-Cresol |
| Dinitraniline |
| Fluoresceine |
| Dichlorbenzene |
| p-Toluol sulfonic acid |
| p-Toluol sulfon chloride |
| Acetyl chloride |
| Benzoyl chloride |

| Mixture of inorganic and organic agents, both soluble in organic solvents |
|---|
| Barium thiocyanate plus p-cresol |
| Barium thiocyanate plus phenol |

The modified castor oil products have also useful drying properties and may be used in preparation of varnishes. If only drying is important, then smaller proportions of reagents may be added, such as fractions of 1%, like 0.1%, or 0.2%, 0.05%.

The modifying agents herein described are polar compounds. Polar compounds contain a positive charge in one part of the molecule and a negative charge in another part of the molecule. A polar compound which is soluble in an organic solvent, is a dissolution-promoting polar compound or one which has dispersing properties.

What I claim is:

1. A coating composition, comprising a solution of a cellulose derivative lacquer base chosen from the class consisting of cellulose esters and ethers in an organic solvent, and also comprising a fatty oil having dispersed therein at a temperature of 100° C. to 300° C. not more than 10 percent of a polar compound but enough to improve dispersing properties in said solution, said polar compound having dispersing properties due to its being soluble in said solvent, the ratio of said fatty oil to said lacquer base being greater than unity and said solution being free from tendency to flocculate.

2. The composition of claim 1, in which the lacquer base is a cellulose ester.

3. The composition of claim 1, in which the lacquer base is nitrocellulose.

4. The composition of claim 1, in which the polar compound is a solid organic polar compound that is soluble in organic solvents.

5. The composition of claim 1, in which the polar compound is a solid organic polar compound that is soluble in organic solvents containing an acidic inorganic residue and an organic residue in the molecule.

6. The composition of claim 1, in which the polar compound is a solid organic polar compound that is soluble in organic solvents containing an aromatic residue and a hydroxy group in the molecule.

7. The composition of claim 1, in which the polar compound is a solid organic polar compound that is soluble in organic solvents, said polar compound containing an amino group in the molecule.

8. The composition of claim 1, in which the fatty oil is a non-drying oil.

9. The composition of claim 1, in which the fatty oil is a drying oil.

10. The composition of claim 1, in which the fatty oil is linseed oil.

11. The composition of claim 1, in which the fatty oil is castor oil.

12. The process of producing a coating composition that is free from tendency to flocculate, which comprises dissolving in an organic solvent a cellulose derivative lacquer base chosen from the class consisting of cellulose esters and ethers and adding a fatty oil having dispersed therein at a temperature of 100° C. to 300° C. not more than 10 percent of a polar compound but enough to improve dispersing properties in said solution, said polar compound having dispersing properties and being soluble in said solvent, the ratio of said fatty oil to said lacquer base being greater than unity.

13. The process of claim 12, in which the lacquer base is a cellulose ester.

14. The process of claim 12, in which the lacquer base is nitrocellulose.

15. The process of claim 12, in which the fatty oil is a non-drying oil.

16. The process of claim 12, in which the fatty oil is a drying oil.

17. The process of claim 12, in which the fatty oil is linseed oil.

18. The process of claim 12, in which the fatty oil is castor oil.

LASZLO AUER.

Certificate of Correction

Patent No. 2,293,038. August 18, 1942.

LASZLO AUER

It is hereby certified that errors appear in the printed specification of the above numbered patent requiring correction as follows: Page 3, first column, line 21, for "Pipe oil" read *Pine oil*; page 4, second column, line 67, for "Mono-btuyl" read *Mono-butyl*; page 8, first column, line 10, for the words "of on" read *or on*; page 10, first column of Table I, lines 21 to 29 inclusive, for "Organic modifying and simultaneously dissolution promoting agents, basic
Urea
Meta-xylidine
Benzidine base
Acidic, or containing acidic residues
Benzoic acid
H. salt"

read

Organic modifying and simultaneously dissolution promoting agents:
BASIC:
Urea
Meta-xylidine
Benzidine base
ACIDIC, OR CONTAINING ACIDIC RESIDUES:
Benzoic acid
H. salt page 11, Table II, in the heading, for

| Inorganic modifying agents | | Plus organic dissolution promoting agents |
|---|---|---|
| Soluble in organic solvents alone | Insoluble in organic solvents alone | | read

| Soluble in organic solvents | Inorganic modifying agents | |
|---|---|---|
| | Insoluble in organic solvents | |
| | Alone | Plus organic dissolution promoting agents | and that the said Letters Patent should be read with these corrections therein that the same may conform to the record of the case in the Patent Office.

Signed and sealed this 12th day of January, A. D. 1943.

[SEAL]

HENRY VAN ARSDALE,
*Acting Commissioner of Patents.*

Certificate of Correction

Patent No. 2,293,038.                                                                August 18, 1942.

LASZLO AUER

It is hereby certified that errors appear in the printed specification of the above numbered patent requiring correction as follows: Page 3, first column, line 21, for "Pipe oil" read *Pine oil;* page 4, second column, line 67, for "Mono-btuyl" read *Mono-butyl;* page 8, first column, line 10, for the words "of on" read *or on;* page 10, first column of Table I, lines 21 to 29 inclusive, for "Organic modifying and simultaneously dissolution promoting agents, basic
Urea..................
Meta-xylidine..........
Benzidine base.........
Acidic, or containing acidic residues
Benzoic acid..........
H. salt..............."

read

Organic modifying and simultaneously dissolution promoting agents:
BASIC:
Urea..................
Meta-xylidine..........
Benzidine base.........
ACIDIC, OR CONTAINING ACIDIC RESIDUES:
Benzoic acid..........
H. salt...............

page 11, Table II, in the heading, for

| Inorganic modifying agents | | Plus organic dissolution promoting agents |
|---|---|---|
| Soluble in organic solvents alone | Insoluble in organic solvents alone | | read

| Soluble in organic solvents | Inorganic modifying agents | |
|---|---|---|
| | Insoluble in organic solvents | |
| | Alone | Plus organic dissolution promoting agents | and that the said Letters Patent should be read with these corrections therein that the same may conform to the record of the case in the Patent Office.

Signed and sealed this 12th day of January, A. D. 1943.

[SEAL]

HENRY VAN ARSDALE,
*Acting Commissioner of Patents.*